United States Patent [19]
Sekine et al.

[11] Patent Number: 5,631,922
[45] Date of Patent: May 20, 1997

[54] SPREAD CODE GENERATION DEVICE FOR SPREAD SPECTRUM COMMUNICATION

[75] Inventors: Kiyoki Sekine; Toshio Kato; Manabu Kawabe; Takuro Sato, all of Tokyo, Japan

[73] Assignee: Oki Electric Industry Co., Ltd., Tokyo, Japan

[21] Appl. No.: 426,254

[22] Filed: Apr. 21, 1995

[30] Foreign Application Priority Data

Apr. 28, 1994 [JP] Japan .................................. 6-091912

[51] Int. Cl.$^6$ .............................. H04B 15/00; H04K 1/00; H04L 27/30
[52] U.S. Cl. .............................. 375/206; 375/206; 370/342
[58] Field of Search .................................. 375/200, 206, 375/205; 370/18, 19, 107; 364/717; 327/164; 380/34, 46; 331/78

[56] References Cited

U.S. PATENT DOCUMENTS

| Re. 35,209 | 4/1996 | Partyka et al. | 375/206 |
|---|---|---|---|
| 5,438,596 | 8/1995 | Sugita | 331/78 |
| 5,488,662 | 1/1996 | Fox et al. | 380/34 |

OTHER PUBLICATIONS

TIA/EIA Interim Standard, "Mobile Station–Base Station Compatibility Standard for Dual–Mode Wideband Spread Spectrum Cellular System", Telecommunications Indsutry Assoc., TIA/EIA/IS–95, Jul. 1993.

*Primary Examiner*—Stephen Chin
*Assistant Examiner*—Don Vo
*Attorney, Agent, or Firm*—Wenderoth, Lind & Ponack

[57] ABSTRACT

There is disclosed a spread code generation device for spread spectrum communication wherein an input data is modulated so as to be spread by a spread code having a first period. The device includes a long period PN code generator for generating a spread code having a second period longer than the first period, an initial state register for storing an initial phase of the spread code having the first period output from the long period PN code generator and for outputting the initial phase to the long period PN code generator, and a counter for receiving and computing the spread code output from the long period PN code generator and for outputting a trigger signal to the initial state register when the computed spread code reaches the first period. The initial state register outputs the initial phase to the long period PN code generation in response to the trigger signal from the counter. The long period PN code generator is reset to the initial phase when the initial phase is input to the long period PN code generator, whereby the spread code having the first period is output from the counter.

16 Claims, 5 Drawing Sheets

SPREAD CODE GENERATION DEVICE FOR SPREAD SPECTRUM COMMUNICATION

REFERENCE TO RELATED APPLICATION

This application claims the priority right under 35 U.S.C 119, of Japanese Patent Application No. Hei 06-091912 filed on Apr. 28, 1994, the entire disclosure of which is incorporated herein by reference.

BACKGROUND OF THE INVENTION

1. Field of the Invention

The present invention relates to a spread code generation device for spread spectrum communication and, more particularly, to a spread code generation device applicable to a mobile radio terminal device (hereinafter simply called as a mobile station) or a base station which are effectively utilized in a mobile communication system employing Code Distribution Multiple Access (CDMA) operations such as a personal communication system (PCS), a digital cellular, or the like.

2. Description of the Related Art

A CDMA communication method, one of the spread spectrum communication methods, has been disclosed, for example, in "Mobile Station-Base Station Compatibility Standard for Dual-Mode Wideband Spread Spectrum Cellular System" TIA/EIA/IS-95, July 1993 as a TIA/EIA Interim Standard. According to a device disclosed in the above document, a mobile station and a base station respectively generate three kinds of spread codes for communication constituted of I-phase and Q-phase spread code generators for a spread Quadrature Phase Shift Keying (QPSK), and a code generator for cryptographic scrambling. By transmitting data from an interleaving coder in parallel with I-phase and Q-phase respectively by employing the spread QPSK, an SN ratio of the transmitted signal can be improved by approximately 3 [dB].

The communication device employing the spread QPSK disclosed in the above document, however, unifies two series of data path from the interleaving coder by time dividing with a switch, spreads these data series respectively through spread code generators which are disposed in each I-phase and Q-phase, and transmits them concurrently. Accordingly, the conventional technology requires each of independent code generators for I-phase and Q-phase, which necessitates a hardware design to satisfy the above conditions and further causes a problem that a scale of the device is inevitably enlarged. Also, since a length of the code series generated is inevitably restricted depending upon the series employed in the system, the length can not be determined voluntarily or optionally. Therefore, there also arises a problem that the design of the communication method and system must be done with big restrictions.

SUMMARY OF THE INVENTION

Accordingly, it is a primary object of the present invention to provide a spread code generation device for spread spectrum communication in which the length of the code series generated can be voluntarily determined so that a flexible system design can be accomplished.

Another object of the present invention is to provide a spread code generation device for spread spectrum communication in which all the code series are generated by a single code generator so that a simplified hardware can be easily realized.

To accomplish the above objects, there is provided a spread code generation device for spread spectrum communication wherein an input data is modulated so as to be spread by a spread code having a first period. The device includes:

(a) a long period PN code generator for generating a spread code having a second period longer than the first period;

(b) an initial state register for storing an initial phase of the spread code having the first period output from the long period PN code generator and for outputting the initial phase to the long period PN code generator;

(c) a counter for receiving and computing the spread code output from the long period PN code generator and for outputting a trigger signal to the initial state register when the computed spread code reaches the first period; and (d) a controller for outputting the spread code having the first period from the counter by designating the initial phase to the initial state register and by designating the first period to the counter. The initial state register outputs the initial phase to the long period PN code generator in response to the trigger signal from the counter. The long period PN code generator is reset to the initial phase when the initial phase is input to the long period PN code generator so that the spread code having the first period is output from the counter.

According to another aspect of the present invention, there is provided a spread code generation device for spread spectrum communication wherein an input data is modulated so as to be spread by a spread code having a first period. The device includes:

(a) a long period PN code generator for generating a spread code having a second period longer than the first period;

(b) an initial state register for storing an initial phase of the spread code having the first period output from the long period PN code generator and for outputting the initial phase to the long period PN code generator;

(c) a counter for receiving and computing the spread code output from the long period PN code generator and for outputting a trigger signal to the initial state register when the computed spread code reaches the first period;

(d) a controller for outputting the spread code having the first period from the counter by designating the initial phase to the initial state register and by designating the first period to the counter;

(e) an interleaving coder for encoding the input data in a manner to have two data series and assigning the encoded input data to I-phase and Q-phase, respectively, in a QPSK modulation;

(f) a first multiplier for receiving the encoded input data from the interleaving coder assigned to I-phase and the spread code having the first period from the counter; and (g) a second multiplier for receiving the encoded input data from the interleaving coder assigned to Q-phase and the spread code having the first period from the counter.

According to still another aspect of the present invention, there is provided a spread code generation device for spread spectrum communication wherein an input data is modulated so as to be spread by a spread code having a first period. The device includes:

(a) a long period PN code generator for generating a spread code having a second period longer than the first period;

(b) a counter for receiving and computing the spread code output from the long period PN code generator and for outputting a trigger signal when the computed spread code reaches the first period; and (c) a controller for outputting the spread code having the first period from the counter by designating an initial phase of the spread code having the first period to the long period PN code generator and by designating the first period to the counter. The controller outputs the initial phase to the long period PN code generator in response to the trigger signal from the counter. The long period PN code generator is reset to the initial phase when the initial phase is input to the long period PN code generator so that the spread code having the first period is output from the counter.

According to further aspect of the present invention, there is provided a spread code generation device for spread spectrum communication wherein an input data is modulated so as to be spread by a spread code having a first period. The device includes:

(a) a long period PN code generator for generating a spread code having a second period longer than the first period;

(b) a counter for receiving and computing the spread code output from the long period PN code generator and for outputting a trigger signal when the computed spread code reaches the first period;

(c) a controller for outputting the spread code having the first period from the counter by designating an initial phase of the spread code having the first period to the long period PN code generator and by designating the first period to the counter;

(d) an interleaving coder for encoding the input data in a manner to have two data series and assigning the encoded input data to I-phase and Q-phase, respectively, in a QPSK modulation;

(e) a first multiplier for receiving the encoded input data from the interleaving coder assigned to I-phase and the spread code having the first period from the counter; and (f) a second multiplier for receiving the encoded input data from the interleaving coder assigned to Q-phase and the spread code having the first period from the counter.

BRIEF DESCRIPTION OF DRAWINGS

By way of example and to make the description more clear, reference is made to the accompanying drawings in which.

DETAILED DESCRIPTION OF THE PREFERRED EMBODIMENTS

In a CDMA communication system, a call between a base station and a mobile station is established by employing a spread code. In other words, the mobile station selects an optimum base station for communication and the base station assigns channels to the mobile station. Channel distinction is made in accordance with the distinction of the spread code for mobile station so that the number of the spread codes for mobile station (for example, $PN_0 \sim PN_N$ in FIG. 2) corresponds to the number of channels. In taking interferences into accounts from mobile stations which are connected to neighboring other base stations, it is desirable to prepare as many codes as possible to secure a necessary number of channels.

Further, the spread code generation device which can generate the above mentioned spread code is necessitated respectively in each mobile and base station so that the spread code generation device should be constituted of a circuit as small sized as possible in view of simplification of the communication device. On the other hand, restrictions for the period of the spread code provide a big hindrance to design a communication system. Accordingly, in order to provide flexibility in designing, the length of the spread code is necessary to be voluntarily selectable.

In the communication device employing a spread code generation device according to the present embodiment, two series of data encoded by the interleaving coder are respectively assigned to I-phase and Q-phase of the QPSK modulation and the two different series of data in I-phase and Q-phase are spread with the same spread code. Now hereunder, a description will be made with reference to the accompanying drawings as to an embodiment of the spread code generation device according to the present invention.

Figure 1:
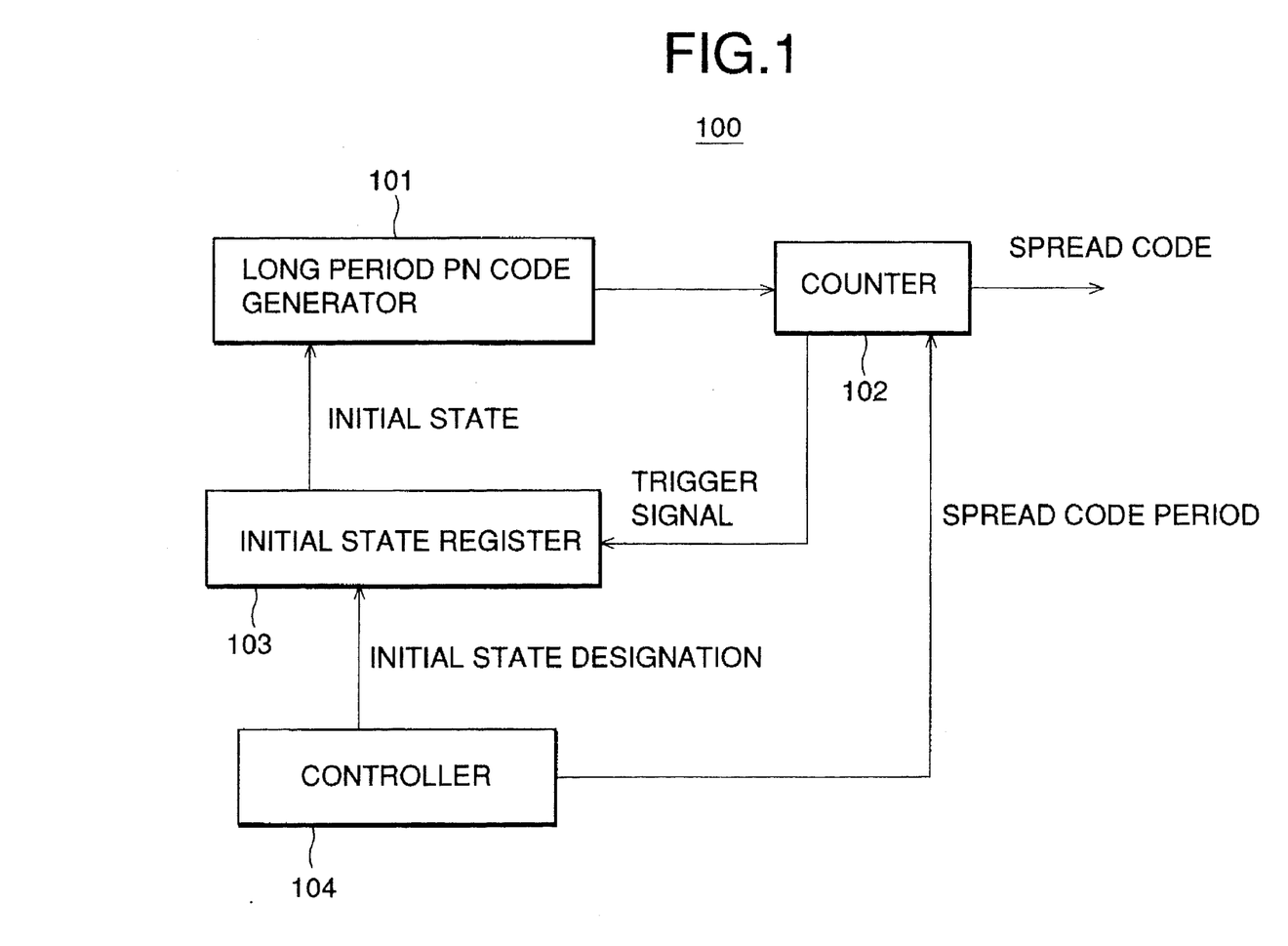
FIG. 1 is a block diagram illustrating a first embodiment of a spread code generation device for spread spectrum communication according to the present invention.
Figure 2:
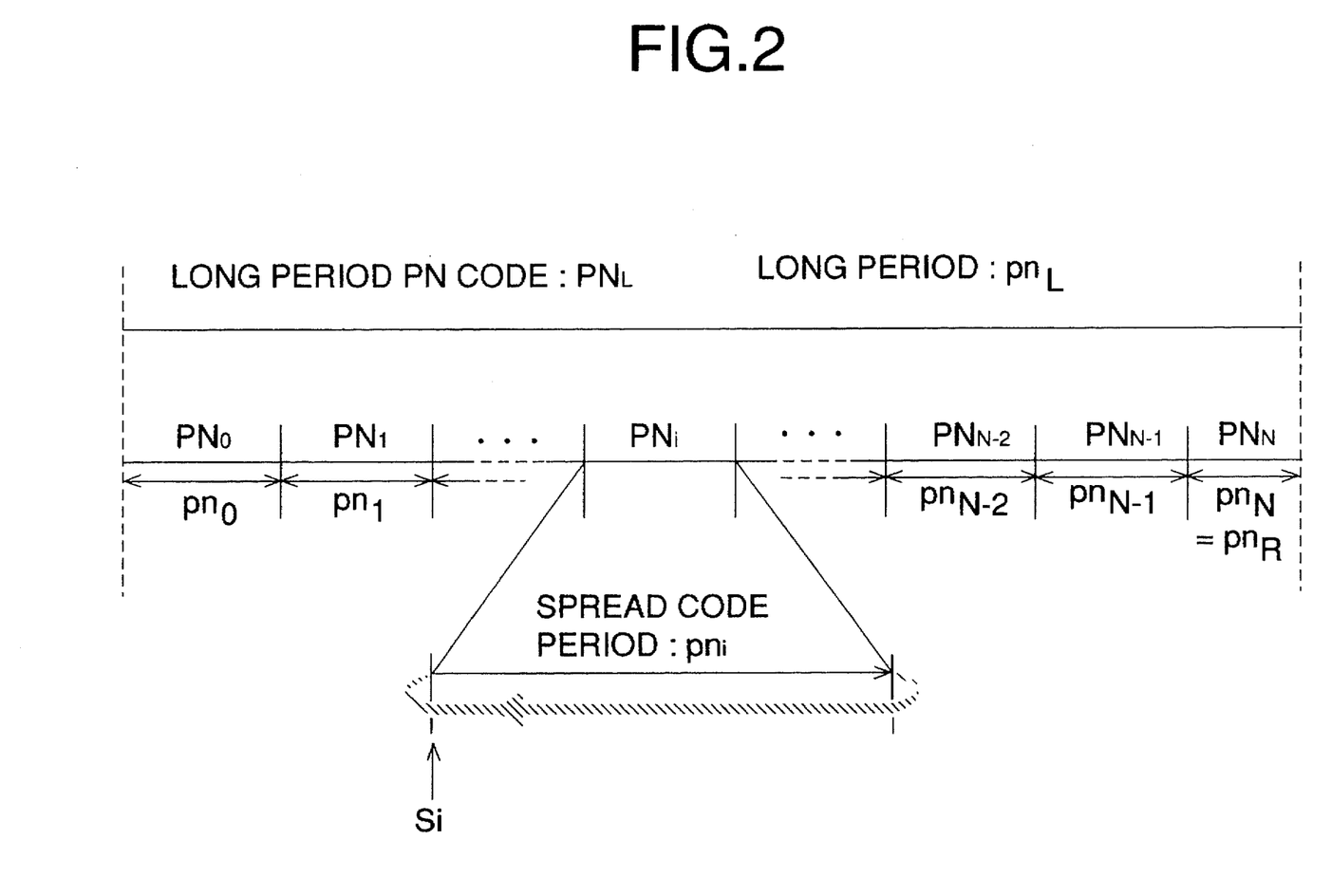
FIG. 2 is an explanatory view illustrating a relation between a long period PN code $PN_L$ and a spread code $PN_i$.

FIG. 1 is a block diagram illustrating the first embodiment of the spread code generation device according to the present invention, in which a spread code generation device 100, as shown in FIG. 2, divides a long period $pn_L$ Output from a common PN code series generator having a certain length of long period into a plurality of voluntarily determined spread code periods $pn_i$ and outputs desired spread codes $PN_0 \sim PN_N$.

The spread code generation device 100 is constituted of a long period PN code generator 101, a counter 102, an initial state register 103 and a controller 104. The long period PN code generator 101 is a common PN code series generator having a certain long length of period. The long period PN code generator 101 receives from the initial state register 103 an initial state signal $S_i$ (i=0~n) indicating an initial phase of the spread code PN and outputs to the counter 102 a code in accordance with an internal clock with regarding the initial state signal $S_i$ as a starting phase.

The counter 102 computes the code output from the long period PN code generator 101 and outputs a trigger signal to the initial state register 103 when the computed value amount reaches to the spread code period $pn_i$. The controller 104 outputs an initial state designation signal to the initial state register 103 and a spread code period signal to the counter 102, respectively, so as to be controlled to generate the spread code PN which is utilized for communication.

FIG. 2 is an explanatory view illustrating a relation between the long period PN code $PN_L$ and the spread code $PN_i$ ($0 \leq i \leq N$), in which the period (hereinafter referred as a long period) of the long period PN code $PN_L$ and the period of the spread code $PN_i$ ($0 \leq i \leq N$) are respectively defined as $pn_L$ and pni, $PN_i$ ($0 \leq i \leq N$) is an optional series and N is a maximum integer satisfying the following condition:

"The total sum of $pn_i$, wherein i satisfies $0 \leq i \leq N$, does not exceed $pn_L$."

The period of the last ordered spread code $PN_N$, in particular, satisfies the following condition, provided $pn_N = pn_R$:

"The total sum of $pn_i$, wherein i satisfies $0 \leq i \leq N$, equals to $pn_L$."

$S_i$ is defined as a state indicating the initial phase of each spread code $PN_i$ ($0 \leq i \leq N$) and $S_i$ is also defined as a value under the above state.

Now, a description will be made with reference to the flowcharts shown in FIGS. 1 and 3 as to steps in which the spread code $PN_i$ ($0 \leq i \leq N$) is produced.

Figure 3:
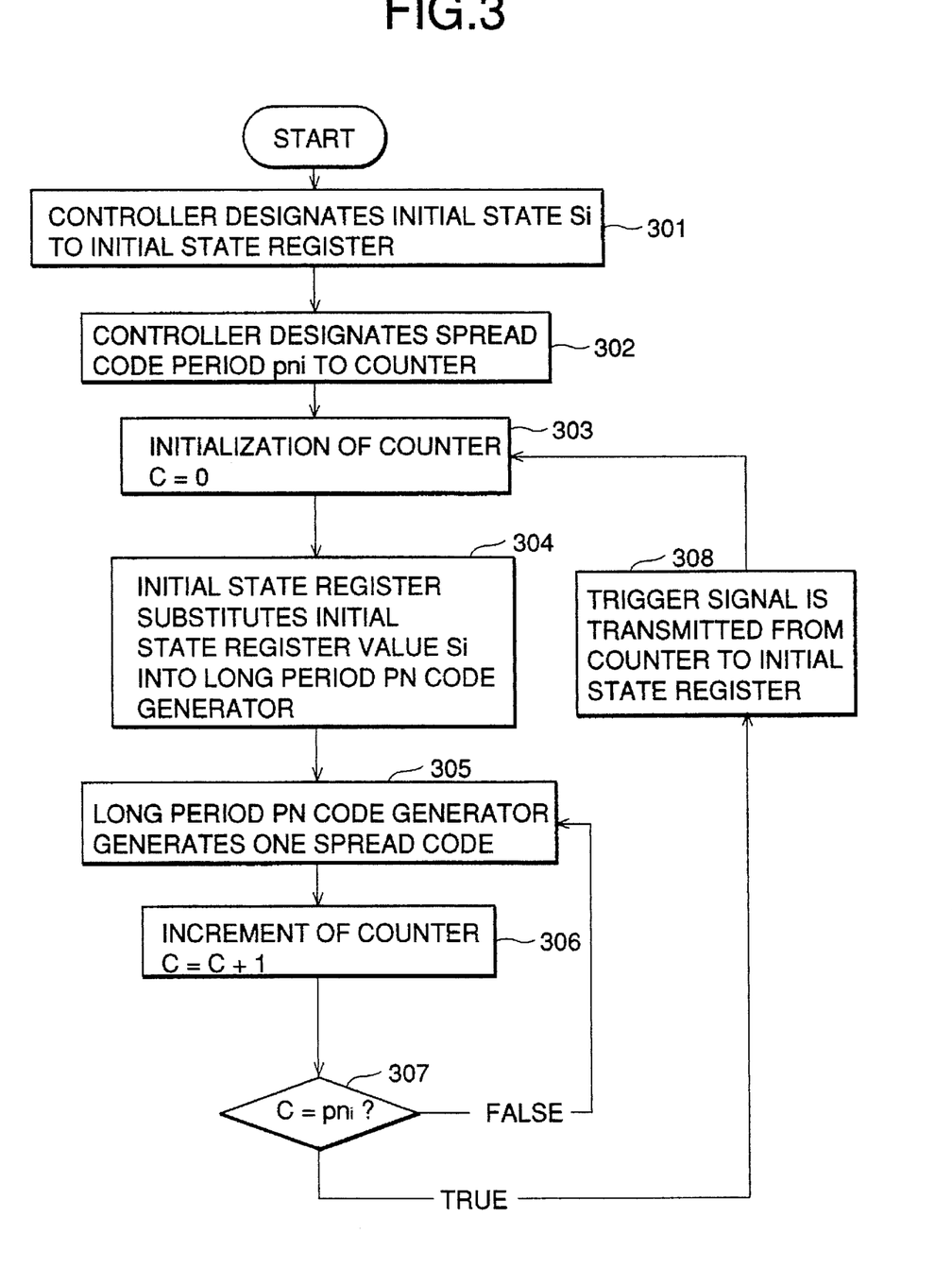
FIG. 3 is a process flowchart illustrating an operation of the spread code generation device shown in FIG. 1.

Firstly, the controller 104 respectively designates to the initial state register 103 the initial state $S_i$ indicating the initial phase of the spread code and to the counter 102 the spread code period $pn_i$ (Steps 301 and 302 in FIG. 3). Then, the counter 102 is initialized (Step 303 in FIG. 3).

The initial state register 103 substitutes the initial state register value $S_i$ which corresponds to the initial state $S_i$ into the long period PN code generator 101 (Step 304). The register value $S_i$ determines the starting phase of the long period PN code. The long period PN code generator 101 generates a code in accordance with an internal clock (Step 305). The counter 102 counts the code generated by the long period PN code generator 101 (Step 306). Then, the generation of the code continues (Steps 305, 306 and 307).

When the counter value reaches to the value of the spread code period $pn_i$ (Step 307), a trigger signal is transmitted from the counter 102 to the initial state register 103 (Step 308). On receipt of the trigger signal, the initial state register 103 again substitutes the register value $S_i$ of the initial state $S_i$ into the long period PN code generator 101 (Step 303) and resets the internal state of the long period PN code generator 101. By repeating the above steps, the spread code from the initial state $S_i$ is regenerated.

Next, a description will be made as to an application to the communication system in which the spread code series generated by the spread code generation device 100 are assigned to the mobile station and the base station. The spread code generation device 100 according to the present embodiment is, concretely, applied to the mobile station or the base station in a mobile communication system employing CDMA communication operations such as a personal communication system, a digital cellular or the like.

The spread code $PN_0$ shown in FIG. 2 is commonly assigned to the all base stations. Data spreading is performed between the base stations by shifting the phases of the spread code series. The mobile terminal (mobile station), discovering the base station which covers the location where the mobile station is currently located, makes its registration to the base station and watches the base station. Notwithstanding the access from the mobile station and the call from the base station, the mobile station utilizes the spread code $PN_i$ designated by the base station as the spread code for the current communication to accomplish the communication.

The designation method is made in accordance with the above mentioned embodiment and the communication is made by designating the initial phase state $S_i$ of the spread code and the period $pn_i$. In the above mentioned communication system, a structure of the device which generates the spread code becomes identical with each other in both the mobile and base stations, which reveals an advantageous feature in designing hardware.

Further, the periods of the spread code series can be easily matched with a frame length and a system synchronization can be easily performed by transmitting from the transmitter a transmission frame in compliance with a receiving frame. Also, the periods of the spread code series can be easily generated in compliance with the spread degree of the system. In other words, when the spread degree falls in an even number, the period can be easily set to be even, whereas when the spread degree falls in an odd number, the period can be easily set to be odd.

Figure 4:
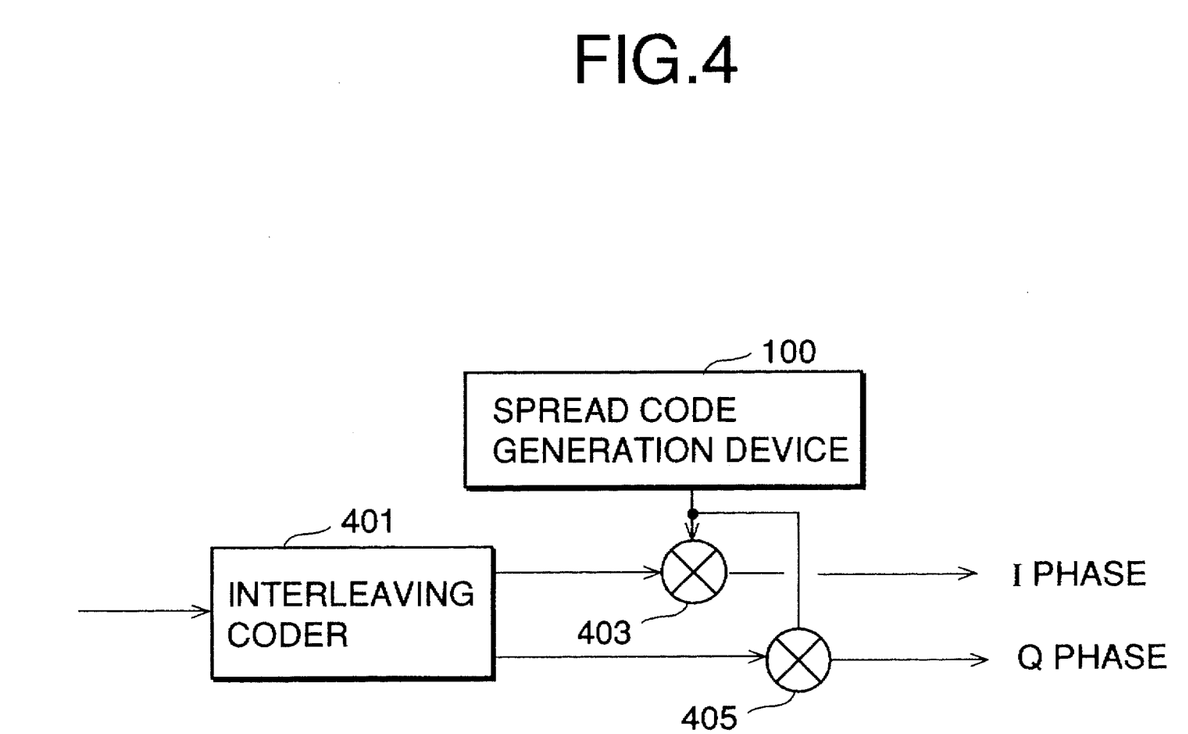
FIG. 4 is a block diagram illustrating a partial view of a communication device to which the present invention is applied.

FIG. 4 is a block diagram illustrating a partial view of a communication device to which the spread code generation device 100 shown in FIG. 1 is applied. The interleaving coder 401 assigns two series of encoded data to I-phase and Q-phase in the QPSK modulation respectively, and outputs them to multipliers 403 and 405. On the other hand, the spread code generation device 100 outputs the identical spread code to the multipliers 403 and 405 and spreads the data series in I-phase and Q-phase which are mutually different with each other. According to the present embodiment, data series different with each other are assigned to I-phase and Q-phase, as shown in FIG. 4, in case of the QPSK modulation so that the single spread code generator 402 can be used.

Figure 5:
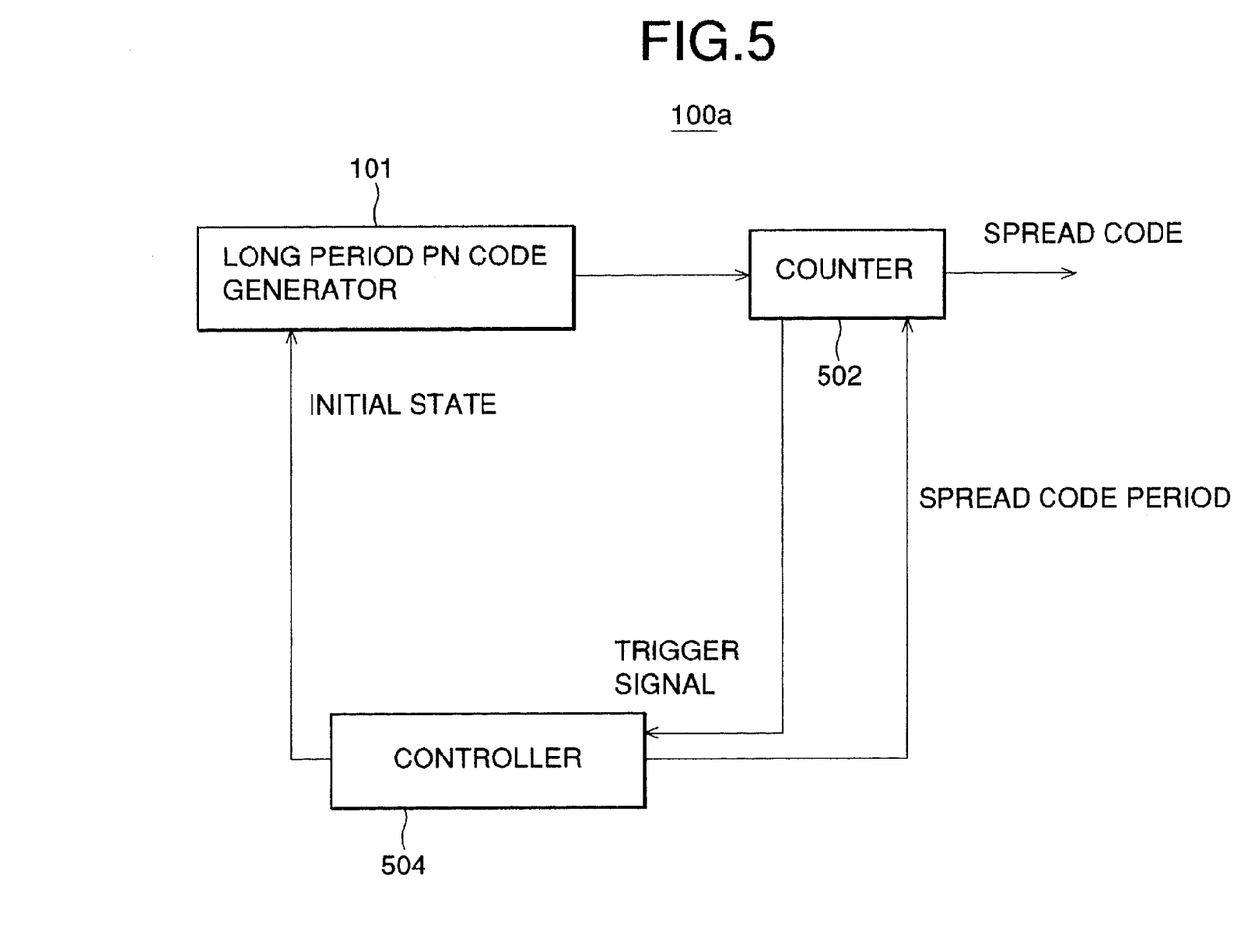
FIG. 5 is a block diagram illustrating a second embodiment of a spread code generation device for spread spectrum communication according to the present invention.

FIG. 5 is a block diagram illustrating one modification 100a of the spread code generation device 100 shown in FIG. 1. As shown in FIG. 5, a controller 504 designates the initial state $S_i$ and the final state which comes after $pn_i$ codes has been output since the initial state $S_i$, and the spread code can be output from a counter 502. In the above mentioned embodiments, there are no limitations as to the kind of the code series output by the long period PN code generator. The spread code generation device shown in FIG. 5 is also applicable to the communication device shown in FIG. 4.

As described in details above, the present invention constitutes a circuit in which the commonly usable long period PN code series generator is connected with both the initial state register which stores the register initial state indicating the initial phase of the spread code and the counter which compares the computed length of the code series with the period of the spread code. A number of the codes output from the long period PN code series generator is counted and computed by the counter. When the computed value exceeds the spread code period, the counter transmits the trigger signal to the initial state register. The initial state register provides the long period PN code series generator with the register initial state to initialize the phase state of the spread code. A partial series having an optional length is taken out from the commonly usable long period PN code series in accordance with the above described procedures and utilized as the spread code so that a plurality of the spread codes each having an optional length can be produced by the commonly usable circuit, which realizes to produce the spread code having the same period as the frame length.

Furthermore, in the communication system in which the spread code having an optional length produced by the code generation device according to the present invention is assigned to the mobile station and the base station, an up-link transmission from the mobile station to the base station and a down-link transmission from the base station to the mobile station can be made with the spread codes having an identical period so that the system synchronization can be simplified. In addition, even or odd spread codes can be selected depending whether the spread degree is even or odd, which realizes a flexible design of the communication system. It has to be noted that the optional length means a length fallen within a range not to exceed the long period $pn_L$.

According to the spread code generation device in accordance with the present invention, lengths of the code series generated can be optionally determined so that a flexible system design can be realized. Since all of the code series are generated by a commonly used single code generator, a hardware design can also be easily realized.

What is claimed is:

1. A spread code generation device for spread spectrum communication wherein an input data is modulated so as to be spread by a spread code having a first period, the device comprising:

(a) a long period PN code generator for generating a spread code having a second period longer than the first period;

(b) an initial state register for storing an initial phase of the spread code having the first period output from the long period PN code generator and for outputting the initial phase to the long period PN code generator;

(c) a counter for receiving and computing the spread code output from the long period PN code generator and for outputting a trigger signal to the initial state register when the computed spread code reaches the first period; and (d) a controller for outputting the spread code having the first period from the counter by designating the initial phase to the initial state register and by designating the first period to the counter; the initial state register outputting the initial phase to the long period PN code generator in response to the trigger signal from the counter; the long period PN code generator being reset to the initial phase when the initial phase is input to the long period PN code generator;

whereby the spread code having the first period is output from the counter.

2. A spread code generation device as set forth in claim 1, wherein the device is applied to a CDMA communication system.

3. A spread code generation device as set forth in claim 1, wherein the device is applied to a personal communication system (PCS).

4. A spread code generation device as set forth in claim 1, wherein the device is applied to a digital cellular mobile communication system.

5. A spread code generation device for spread spectrum communication wherein an input data is modulated so as to be spread by a spread code having a first period, the device comprising:

(a) a long period PN code generator for generating a spread code having a second period longer than the first period;

(b) an initial state register for storing an initial phase of the spread code having the first period output from the long period PN code generator and for outputting the initial phase to the long period PN code generator;

(c) a counter for receiving and computing the spread code output from the long period PN code generator and for outputting a trigger signal to the initial state register when the computed spread code reaches the first period;

(d) a controller for outputting the spread code having the first period from the counter by designating the initial phase to the initial state register and by designating the first period to the counter;

(e) an interleaving coder for encoding the input data in a manner to have two data series and assigning the encoded input data to I-phase and Q-phase, respectively, in a QPSK modulation;

(f) a first multiplier for receiving the encoded input data from the interleaving coder assigned to I-phase and the spread code having the first period from the counter; and (g) a second multiplier for receiving the encoded input data from the interleaving coder assigned to Q-phase and the spread code having the first period from the counter.

6. A spread code generation device as set forth in claim 5, wherein the device is applied to a CDMA communication system.

7. A spread code generation device as set forth in claim 5, wherein the device is applied to a mobile station.

8. A spread code generation device as set forth in claim 5, wherein the device is applied to a base station.

9. A spread code generation device for spread spectrum communication wherein an input data is modulated so as to be spread by a spread code having a first period, the device comprising:

(a) a long period PN code generator for generating a spread code having a second period longer than the first period;

(b) a counter for receiving and computing the spread code output from the long period PN code generator and for outputting a trigger signal when the computed spread code reaches the first period; and (c) a controller for outputting the spread code having the first period from the counter by designating an initial phase of the spread code having the first period to the long period PN code generator and by designating the first period to the counter; the controller outputting the initial phase to the long period PN code generator in response to the trigger signal from the counter; the long period PN code generator being reset to the initial phase when the initial phase is input to the long period PN code generator;

whereby the spread code having the first period is output from the counter.

10. A spread code generation device as set forth in claim 9, wherein the device is applied to a CDMA communication system.

11. A spread code generation device as set forth in claim 9, wherein the device is applied to a personal communication system (PCS).

12. A spread code generation device as set forth in claim 9, wherein the device is applied to a digital cellular mobile communication system.

13. A spread code generation device for spread spectrum communication wherein an input data is modulated so as to be spread by a spread code having a first period, the device comprising:

(a) a long period PN code generator for generating a spread code having a second period longer than the first period;

(b) a counter for receiving and computing the spread code output from the long period PN code generator and for outputting a trigger signal when the computed spread code reaches the first period;

(c) a controller for outputting the spread code having the first period from the counter by designating an initial phase of the spread code having the first period to the long period PN code generator and by designating the first period to the counter;

(d) an interleaving coder for encoding the input data in a manner to have two data series and assigning the encoded input data to I-phase and Q-phase, respectively, in a QPSK modulation;

(e) a first multiplier for receiving the encoded input data from the interleaving coder assigned to I-phase and the spread code having the first period from the counter; and (f) a second multiplier for receiving the encoded input data from the interleaving coder assigned to Q-phase and the spread code having the first period from the counter.

14. A spread code generation device as set forth in claim 13, wherein the device is applied to a CDMA communication system.

15. A spread code generation device as set forth in claim 13, wherein the device is applied to a mobile station.

16. A spread code generation device as set forth in claim 13, wherein the device is applied to a base station.

* * * * *